United States Patent
Ike et al.

(10) Patent No.: US 9,207,916 B2
(45) Date of Patent: Dec. 8, 2015

(54) SIMULATION APPARATUS, METHOD AND MEDIUM

(71) Applicant: FUJITSU LIMITED, Kawasaki-shi (JP)

(72) Inventors: Atsushi Ike, Minato (JP); David Thach, Meguro (JP)

(73) Assignee: FUJITSU LIMITED, Kawasaki (JP)

( * ) Notice: Subject to any disclaimer, the term of this patent is extended or adjusted under 35 U.S.C. 154(b) by 400 days.

(21) Appl. No.: 13/858,993

(22) Filed: Apr. 9, 2013

(65) Prior Publication Data
US 2013/0227534 A1 Aug. 29, 2013

Related U.S. Application Data

(63) Continuation of application No. PCT/JP2010/067866, filed on Oct. 12, 2010.

(51) Int. Cl.
*G06F 9/45* (2006.01)
*G06F 9/455* (2006.01)
*G06F 11/34* (2006.01)

(52) U.S. Cl.
CPC .............. *G06F 8/40* (2013.01); *G06F 9/4552* (2013.01); *G06F 11/3457* (2013.01)

(58) Field of Classification Search
None
See application file for complete search history.

(56) References Cited

U.S. PATENT DOCUMENTS

| 6,096,089 | A | 8/2000 | Kageshima |
| 6,751,583 | B1 | 6/2004 | Clarke et al. |
| 2008/0177527 | A1* | 7/2008 | Yoshinaga ....................... 703/26 |

FOREIGN PATENT DOCUMENTS

| JP | 10-254944 | 9/1998 |
| JP | 2000-222245 | 8/2000 |
| JP | 2004-227204 | 8/2004 |
| JP | 2006-23852 | 1/2006 |

OTHER PUBLICATIONS

Notification of Transmittal of Translation of the International Preliminary Report on Patentability (Form PCT/IB/338, Form PCT/IB/373 & Form PCT/ISA/237), International Application No. PCT/JP2010/067866, 5 pages, dated May 10, 2013.
International Search Report, mailed in connection with PCT/JP2010/067866 and mailed Nov. 9, 2010.

* cited by examiner

*Primary Examiner* — Omar Fernandez Rivas
*Assistant Examiner* — Herng-der Day
(74) *Attorney, Agent, or Firm* — Fujitsu Patent Center

(57) ABSTRACT

A code converter 11 of a simulation apparatus 1 detects, during the execution of a program in a target CPU, an externally dependent instruction affected by the external environment in each of divided blocks, predicts the execution result of the externally dependent instruction, simulates the instruction execution in the predicted result, and generates a host code in which a code for performance simulation is embedded based on the simulation result. A simulation executor 12 performs performance simulation about instruction execution in the prediction result of the program using the host code, and when the execution result of the externally dependent instruction is different from the setting of the prediction result during the execution, corrects the execution time of the instruction in the prediction result using the execution time of instructions executed before and after the instruction, and the like. A simulation information collector 13 collects and outputs performance simulation information.

5 Claims, 14 Drawing Sheets

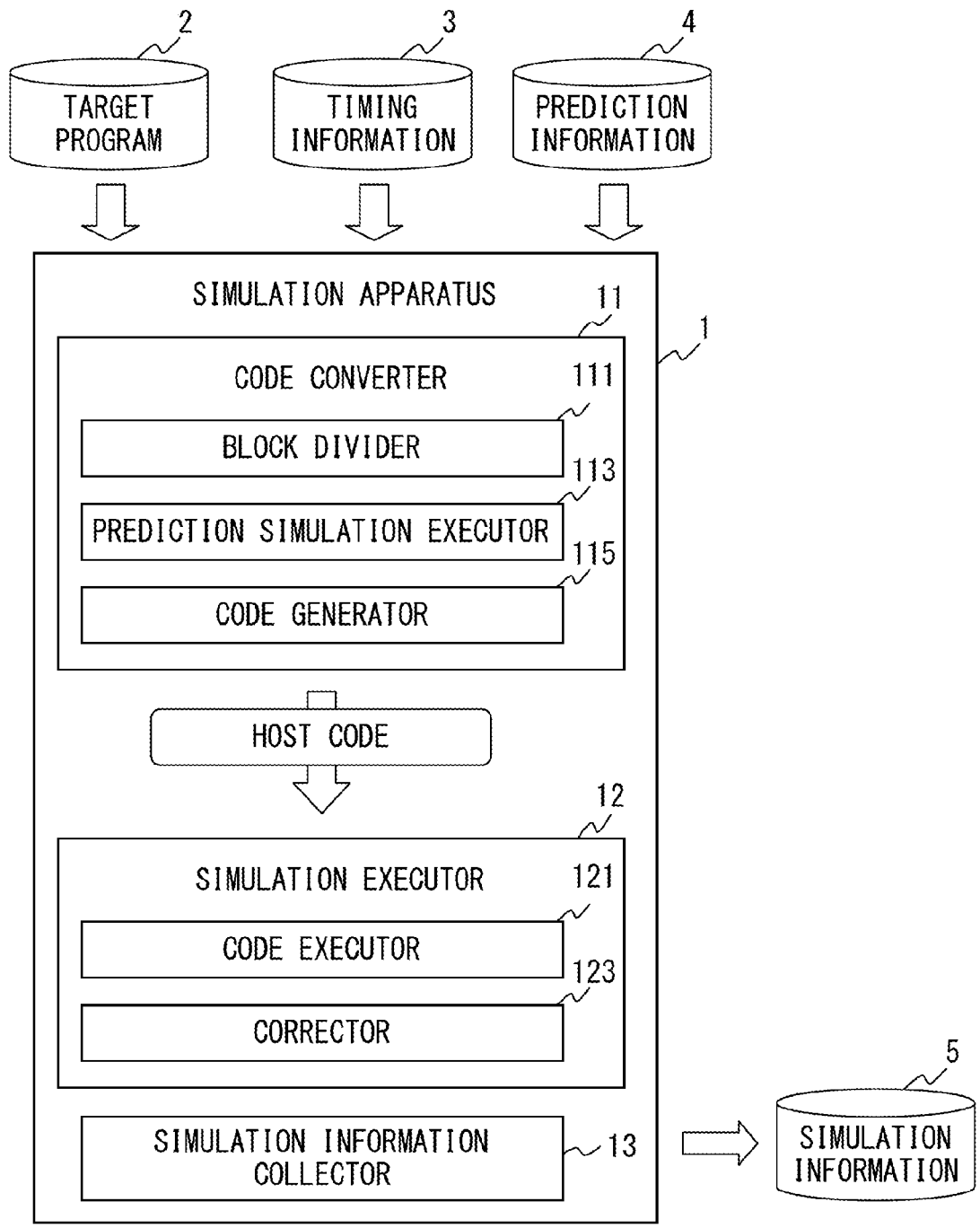
F I G. 1

```
LD      [r1], (r2;)        // [r1] → r2
MULT    r3,   r4,  (r5;)   // r3 * r4 → r5
ADD    (r2,) (r5,) r6;     // r2+r5 → r6
```

FIG. 2

| INSTRUCTION | SOURCE REGISTER | DESTINATION REGISTER | PENALTY |
|---|---|---|---|
| LD | rs1:e1 | rd:e2 | CACHE MISS : 6 |
| MULT | rs1:e1, rs2:e2 | rd:e3 | – |
| ADD | rs1:e1, rs2:e1 | rd:e2 | – |

F I G. 3

```
cache_ld( address, rep_delay, pre_delay ) {
        avail_delay = 0;
        if(pre_delay < current_time - preld_time)
                    avail_delay = pre_delay - current_time + preld_time;
        cache_lookup( address );
        if(cache_hit) {
                    cache_update_onhit( address );
        } else {
                    cache_update_onmiss( address );
                    avail_delay += cache_miss_latency
                    if(rep_delay < avail_delay)
                                avail_delay -= avail_delay - rep_delay;
        }
        preld_time = current_time;
}
```

F I G. 6

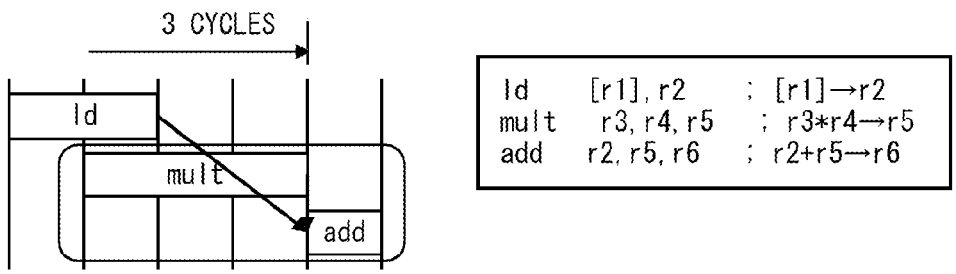
F I G. 7 A
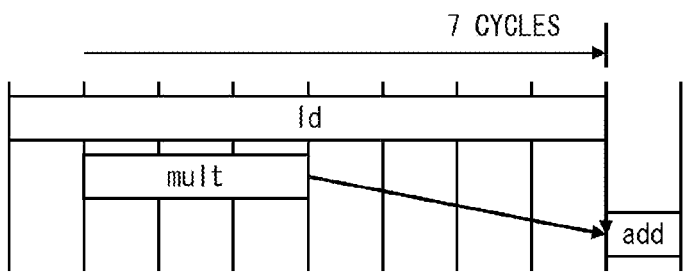
F I G. 7 B
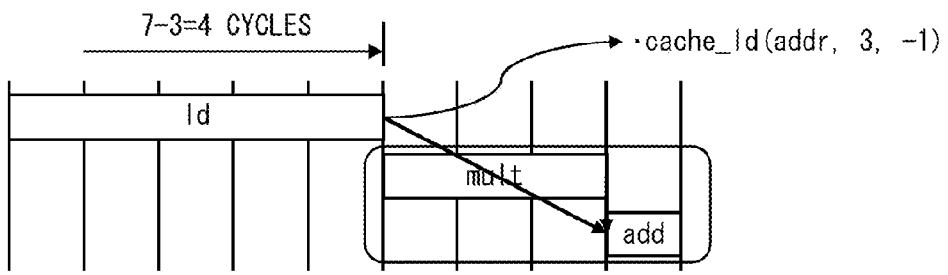
F I G. 7 C
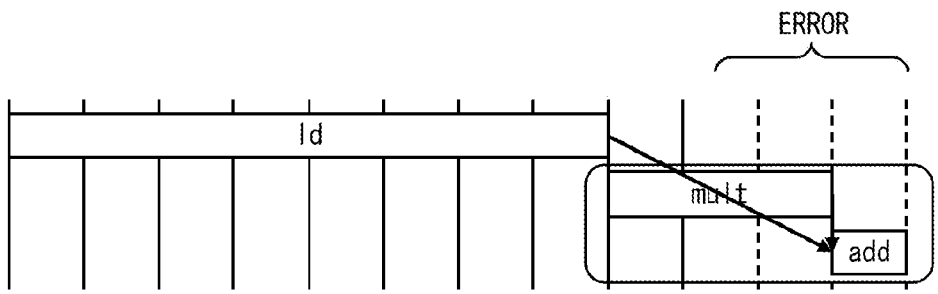
F I G. 7 D

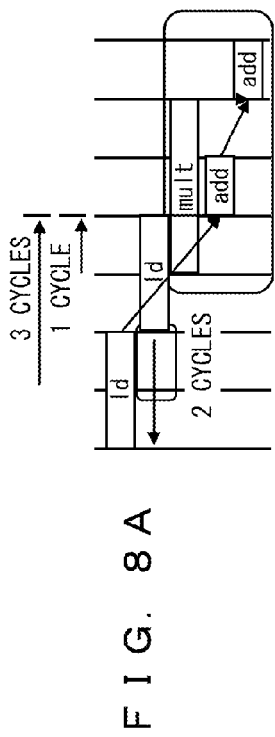
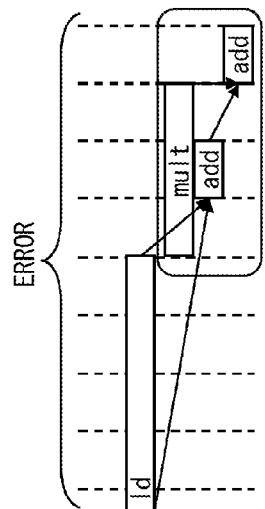
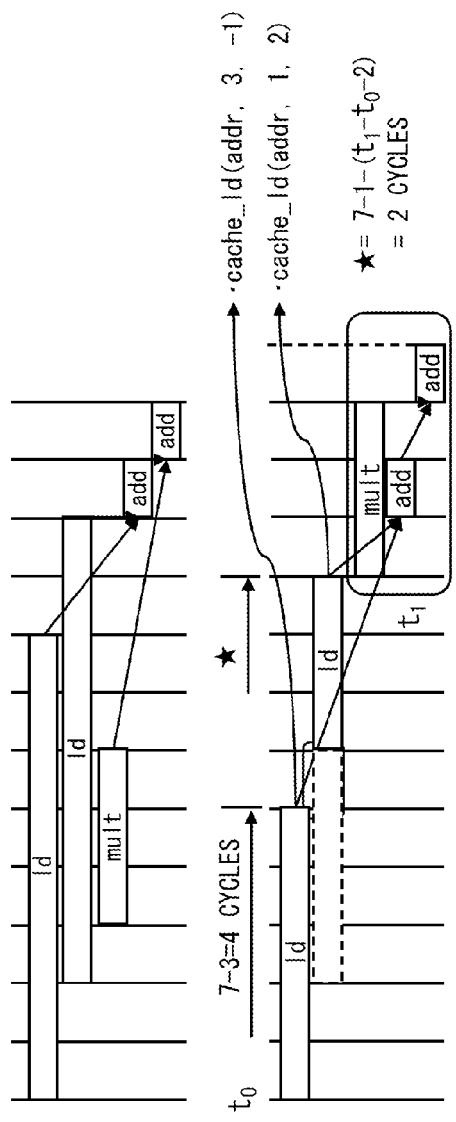
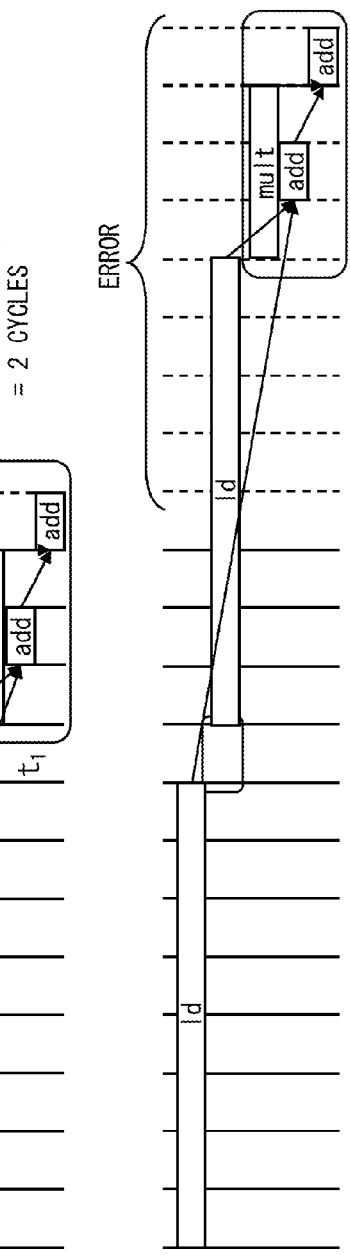
F I G. 8 A
F I G. 8 B
F I G. 8 C
F I G. 8 D

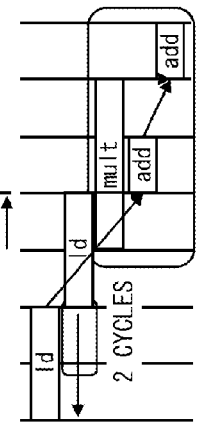
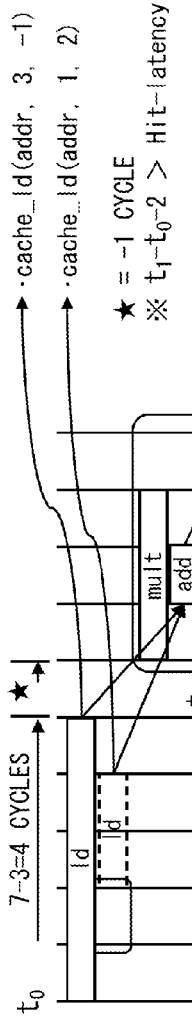
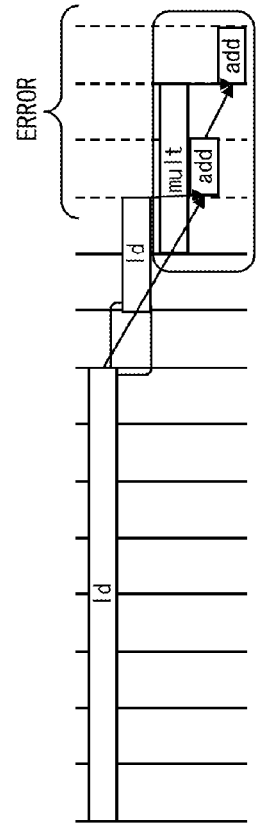
FIG. 9A
FIG. 9B
FIG. 9C
FIG. 9D

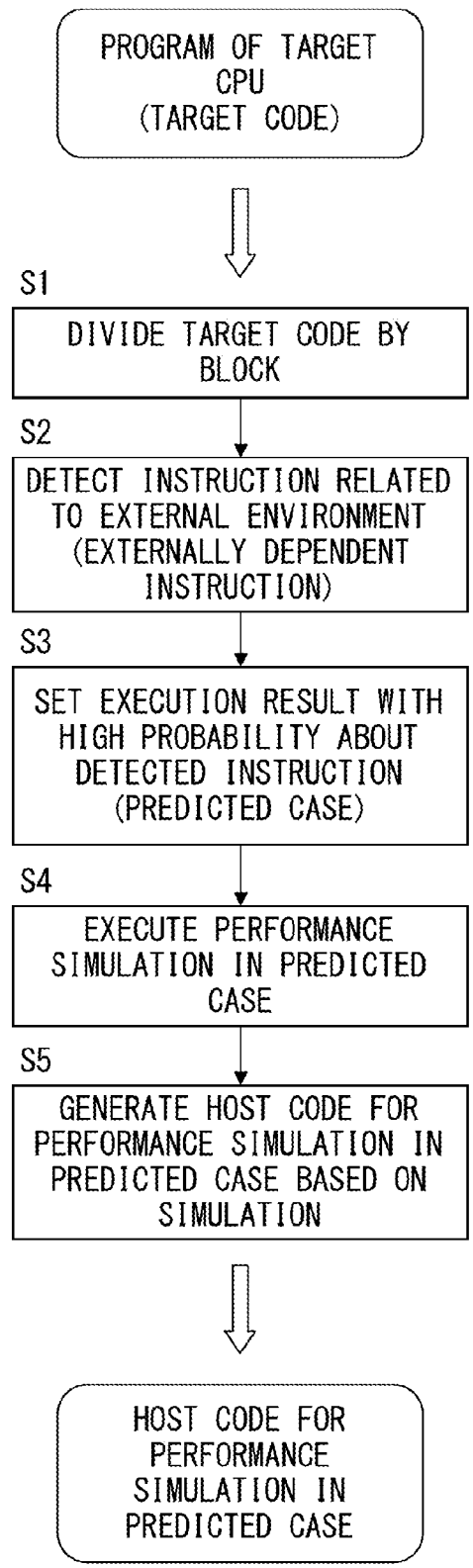
F I G. 10

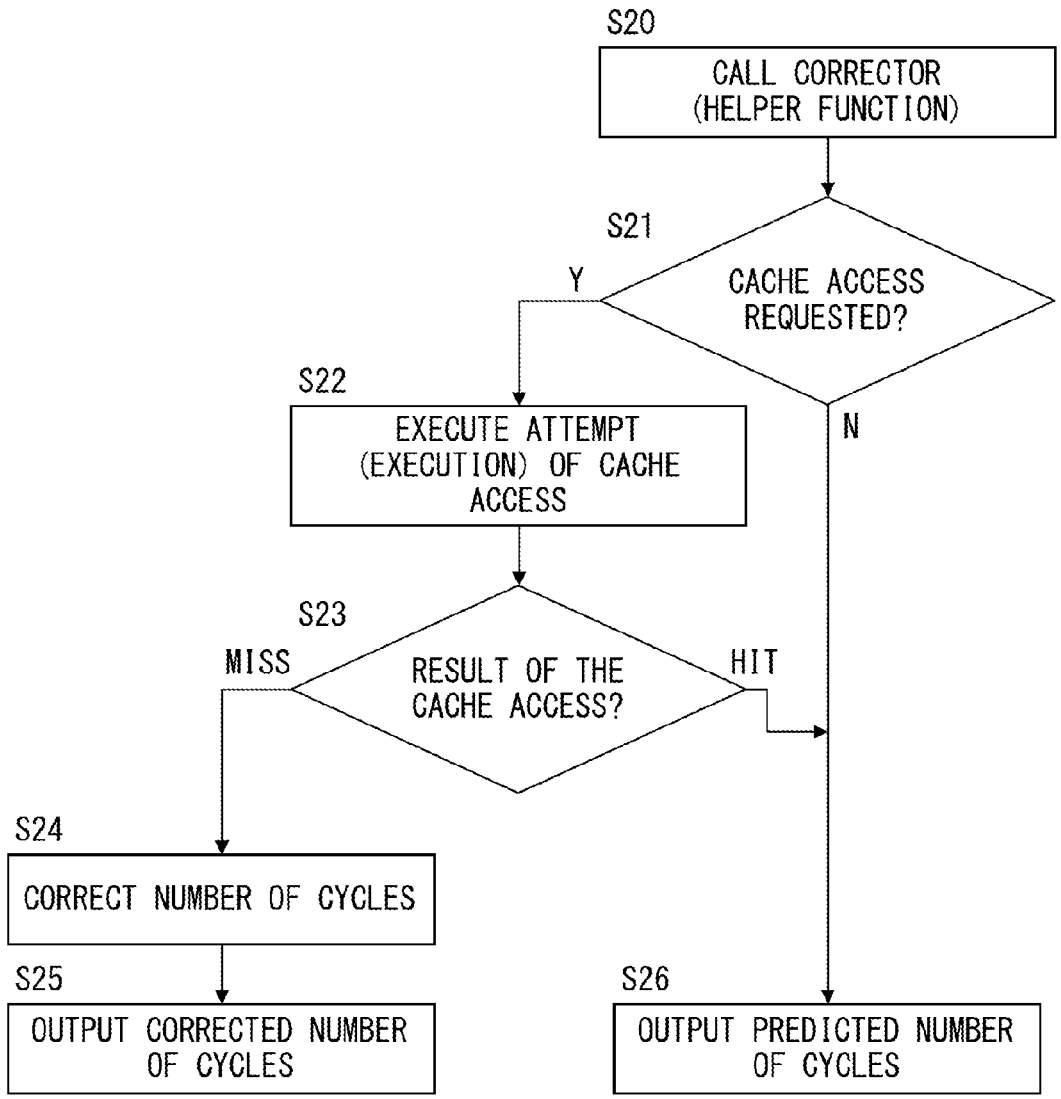
F I G. 1 2

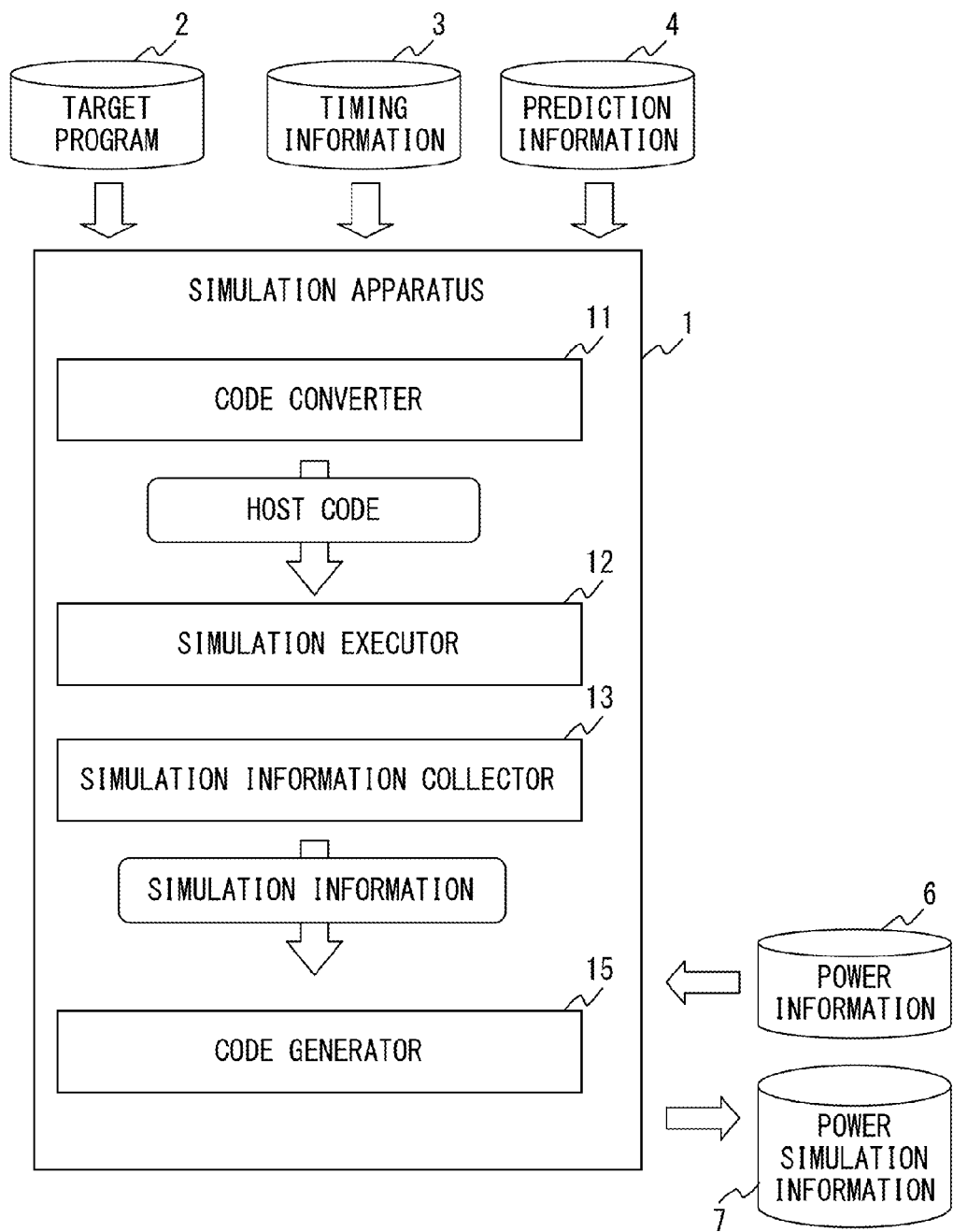
F I G. 1 3

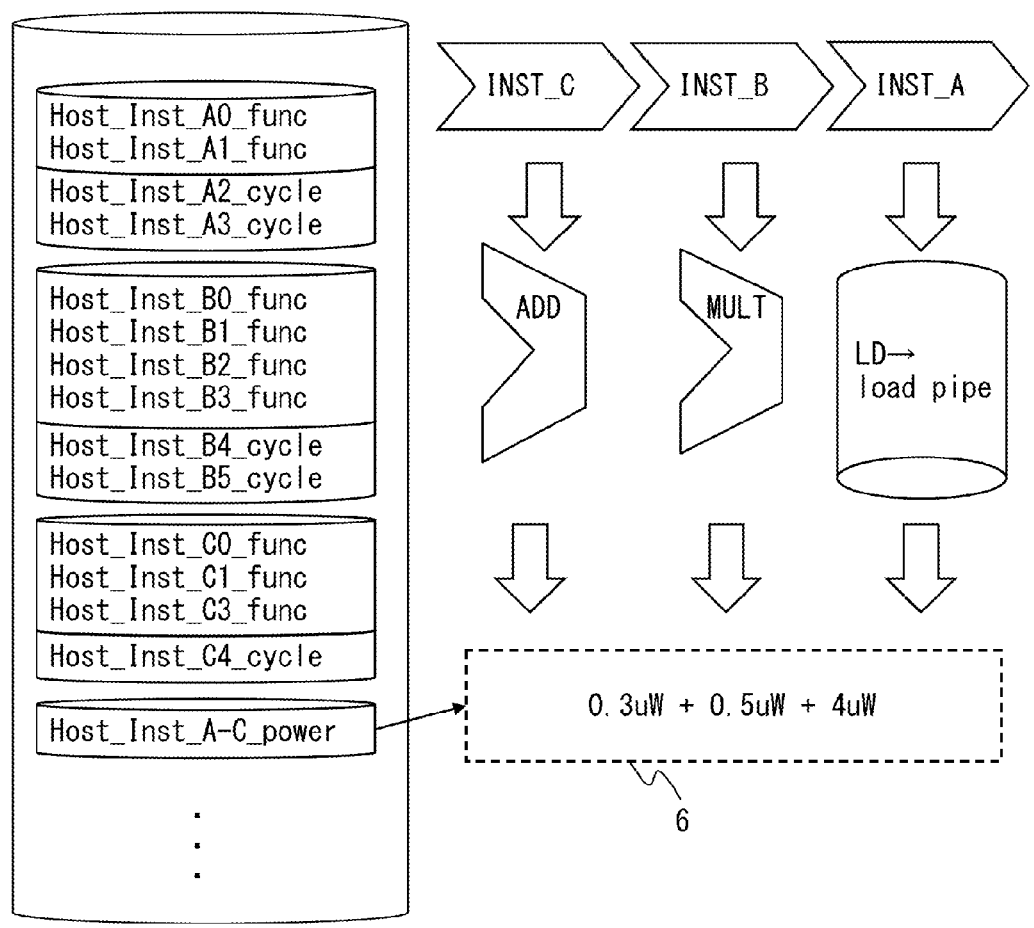
F I G. 14

SIMULATION APPARATUS, METHOD AND MEDIUM

CROSS-REFERENCE TO RELATED APPLICATION

This application is a continuation application of International PCT Application No. PCT/JP2010/067866 which was filed on Oct. 12, 2010.

FIELD

The present invention (The embodiment described herein) relates to a processing technique to obtain simulation information of the performance or the power, about the instruction execution of a processor in a virtually modeled system.

BACKGROUND

Under the current situation where systems have become complicated and the multicore configuration equipped with a plurality of processors (CPUs for example) has become common, the realization of a higher processing speed and processing accuracy has been required for the simulation process of the function, performance, power and the like of each core (CPU).

In the simulation of the function, performance, power consumption, in the case of making the target CPU being the evaluation target on the host CPU, the adoption of the interpreter system or the JIT (Just-in-Time) complier system as the conversion method from the instruction code (target code) of the target CPU to the instruction code (host code) of the host CPU code has been known.

In the simulation in the JIT complier system, for the target CPU being the simulation target, the instruction of the target CPU that appear in the program being executed is replaced with the instruction of the host CPU that executes the simulation, and after that, the replaced instruction is executed. Therefore, the process in the JIT complier system is faster compared with the process in the interpreter system, and in the function simulation of the CPU, the JIT compile system has been adopted especially when the high speed is required.

The performance simulation of the CPU adopting the JIT complier system has also been proposed.

However, in the control of the pipeline process in which the respective units are made to operate independently for each clock and instructions are input one after another and executed in parallel, the internal condition of the CPU changes every time when the process is executed, an advantage of the JIT complier that a host instruction is used repeatedly once it is generated.

Therefore, generally, it has been regarded that the JIT complier method is not suitable for the performance simulation and the power simulation for the CPU that controls the pipeline process and the out-of-order process.

PRIOR ART DOCUMENT

Patent Document

Patent document 1: U.S. Pat. No. 6,751,583 B1
As described above, there has been a problem that, when adopting the interpreter system for the function, performance, power simulation of the CPU that controls the pipeline process, generally, the processing speed is very slow, and it is unable to be utilized as a practical method.

In addition, for the recent high-speed CPU, when the JIT compiler system is adopted for the function simulation, it is possible to manage to perform the process at a practical speed.

However, when adopting the JIT complier system for the simulation of the performance and power, there are various situations before and after the process by the control of the pipeline in the target CPU, and the process load becomes very large because addition of enormous codes simulation according to the internal condition and their instruction execution are required.

Furthermore, in the performance simulation, in order to adjust the timing for the execution delay expected in the target CPU, enormous codes for simulation also needs to be added to the host code. For example, when executing the cycle simulation of the load instruction (LD: load), to check whether the cache miss or cache hit occurs, calculating of all the timing in the case of cache miss, whether there is a penalty cycle that needs to be considered, these condition descriptions need to be added to the host code.

However, on the on the other hand, the amount of codes for the performance simulation (cycle simulation) added to the function code needs to be suppressed as much as possible, to maintain the high performance.

SUMMARY

A simulation apparatus disclosed as an aspect of the present invention is a simulation apparatus that executes a simulation of instruction execution of a program for a target processor that controls a pipeline process, including 1) a code converter configured to perform a process to divide a code of the program into prescribed blocks, and to set an execution result of an externally dependent instruction that is an instruction among instructions included in the blocks whose execution process depends on an external environment as a prediction result; a process to performs a function simulation of instruction execution assuming the prediction result, and to obtain timing information representing an execution timing of an instruction included in the block, and to calculate an execution time of the externally dependent instruction in the prediction result, based on a result of the function simulation and the timing information; and a process to generate, based on the result of the function simulation, a host code to make a host processor that makes the target processor operate, perform a performance simulation of an instruction execution assuming the prediction result; and 2) a simulation executor configured to, when, in an execution result of execution of the generated host code by the host processor, an execution result of the externally dependent instruction included in the host code is different from the prediction result, correct the execution time of the externally dependent instruction in the prediction result by a correction value obtained using a prescribed delay time of the externally dependent instruction and an execution time of instructions executed before and after the externally dependent instruction, and set as the execution time of the externally dependent instruction in the function simulation.

Meanwhile, a simulation method disclosed as another aspect of the present invention includes respective process steps executed by the simulation apparatus.

Furthermore, a simulation program disclosed as another aspect of the present invention makes a computer execute the simulation method.

According to the disclosed simulation apparatus, it becomes possible to perform a high-speed simulation.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed

BRIEF DESCRIPTION OF DRAWINGS

FIG. 1 is a diagram illustrating a configuration example of a simulation apparatus disclosed as an embodiment of the present invention.

FIG. 2 is a diagram illustrating an example of an instruction included in a block.

FIG. 3 is a diagram illustrating an example of timing information.

FIG. 6 is a diagram illustrating a processing operation of a corrector of the simulation apparatus.

FIGS. 7A through 7D are diagrams illustrating a correction example for an execution result of an LD instruction of the corrector of the simulation apparatus.

FIGS. 8A through 8D are diagrams illustrating a correction example for an execution result of an LD instruction of the corrector of the simulation apparatus.

FIGS. 9A through 9D are diagrams illustrating a correction example of an LD instruction execution result of a corrector 123.

FIG. 10 is an outline process flow diagram of a code converter of the simulation apparatus.

FIG. 12 is a diagram illustrating a process flow example of judgment and correction of a prediction result about a process of a load (ld), as an example of an externally dependent instruction.

FIG. 13 is a diagram illustrating a configuration example of a simulation apparatus in another embodiment.

FIG. 14 is a diagram illustrating an example of a power simulation information generator of the simulation apparatus.

DESCRIPTION OF EMBODIMENTS

Figure 4A:
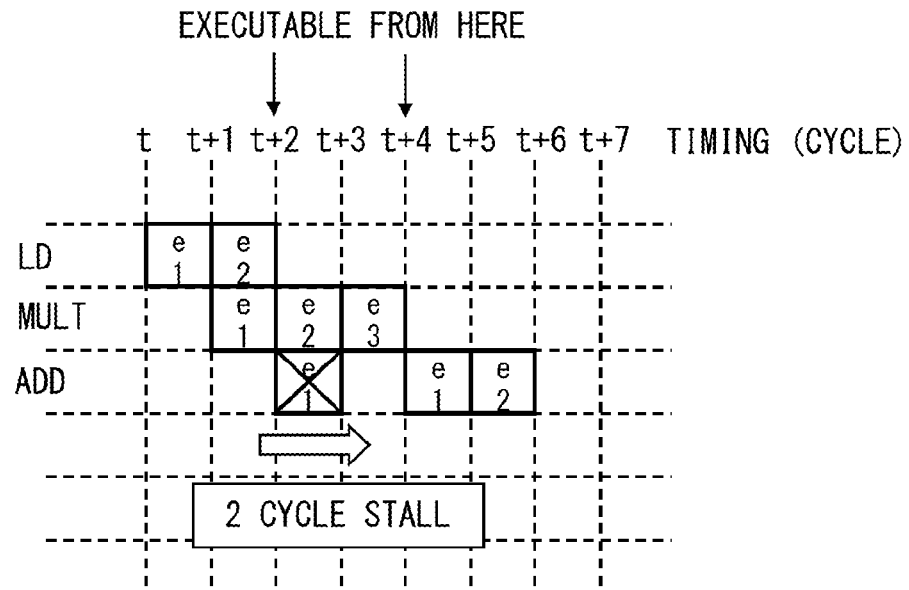
FIGS. 4A and 4B are diagrams illustrating a timing example of execution instruction illustrated in FIG. 2.

FIG. 1 is a diagram illustrating a configuration example of a simulation apparatus disclosed as an embodiment of the present invention.

The simulation apparatus 1 is an apparatus that executes the performance simulation of the instruction execution in a target CPU that controls the pipeline process.

The target CPU is the control model of the CPU being the simulation target. The simulation apparatus 1 outputs cycle simulation information of each instruction as the performance simulation of the instruction execution of the target CPU.

Here, the target CPU is a CPU of the ARM architecture for example. The simulation apparatus 1 corresponding to the host CPU is a computer equipped with a CPU of the X86 architecture for example.

The simulation apparatus 1 includes a code converter 11 and, a simulation executor 12 and a simulation information collector 13.

The code converter 11 is a processor that generates the code (host code) of the host CPU that executes the simulation from the code (target code) of the program executed by the target CPU, at the time of the execution of the program of the target CPU.

The code converter 11 includes a block divider 111, a prediction simulation executor 113, and a code generator 115.

The block divider 111 divides the target code of the program input to the simulation apparatus 1 into a prescribed blocks. The unit of the block division may be the general basic block (the code from a branching until before the next branching) unit, or, may be any code unit determined in advance.

FIG. 2 is a diagram illustrating an example of an instruction included in a block.

As illustrated in FIG. 2, it is assumed that, in a certain block, three instructions of the target code; (1) "LD r1, r2" (load); (2)"MULT r3, r4, r5 (multiplication)"; (3) "ADD r2, r5, r6 (addition)"; (1) "LD r1, r2" (load); (2) "MULT r3, r4, r5 (multiplication)"; (3) "ADD r2, r5, r6 (addition)" are included, which are input to the pipeline of the target CPU and executed in order of (1)-(3). For each instruction, r1-r6 represents the register (address).

The prediction simulation executor 113 is a processor that obtains timing information 3 and prediction information 4, and performs the performance simulation of executing the input block under conditions on the presumption of a certain execution result.

The timing information 3 is information indicating the correspondence between each processing element (stage) at the time of the instruction execution and the available register based on each instruction in the target code, and information indicating the penalty (number of penalty cycle) setting the delay time according to the execution result, for each externally dependent instruction among the instructions.

An externally dependent instruction is an instruction for performing a process to which the external environment is relevant, for example, an instruction such as a load instruction or a store instruction for performing a process in which the execution result of the instruction depends on the external environment outside the target CPU, for example, instruction cache, data cache, TLB search, and furthermore, a branch prediction, an instruction for performing a process such as call/return stack and the like.

FIG. 3 is a diagram illustrating an example of the timing information 3.

The timing information 3 illustrated in FIG. 3. indicates that, about the LD instruction, a source register r s 1 (r1) is available in the first processing element (e1) and a destination register rd (r2) is available in the second processing element (e2).

In addition, it indicates that, for the MULT instruction, the first source register r s 1 (r3) is available in the first processing element (e1), the second source register rs2 (r4) is available in the second processing element (e2), the destination register rd (r5) is available in the third processing element (e3), respectively. In addition, it indicates that, for the ADD instruction, the first source register rs1 (r2), the second source register rs2 (r5) are available in the first processing element (e1) and the destination register rd (r6) is available in the second processing element (e2).

Figure 4B:
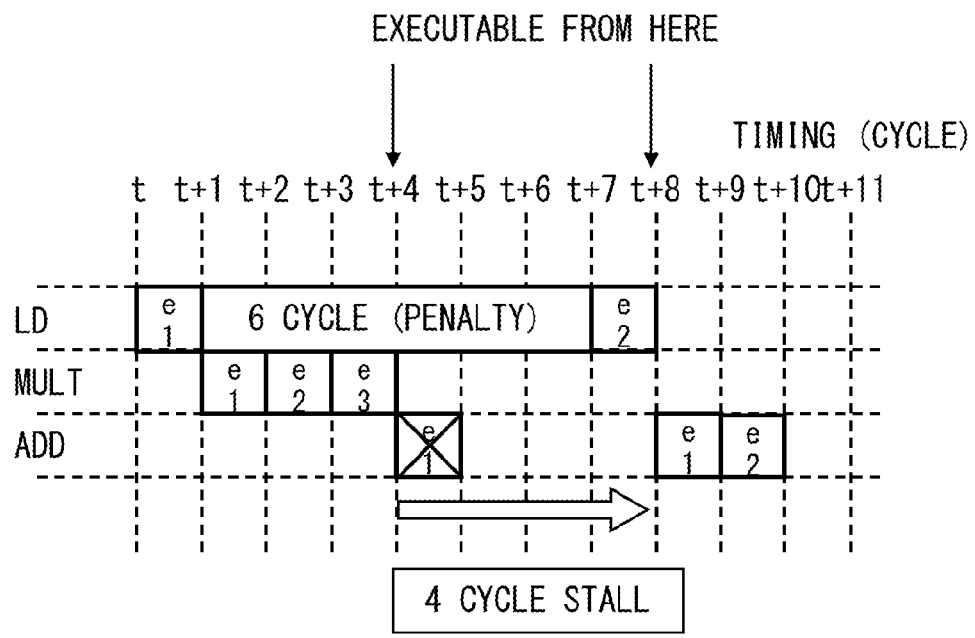

FIGS. 4A and 4B are a diagram illustrating an execution timing example of each instruction of a block illustrated in FIG. 2.

The timing at which each instruction is input to the pipeline is, from the timing information 3 illustrated in FIG. 3, assuming the execution start of the LD instruction as timing t, the MULT instruction is timing t+1, and the ADD instruction is timing t+2.

The first source register (r2) and the second source register (r5) of the ADD instruction are used in the LD instruction and the MULT instruction, the start of the ADD instruction is after timing t+4 of the execution completion of the LD instruction and the MULT instruction, generating a waiting time corresponding to 2 cycles (a stall corresponding to 2 cycles).

Therefore, it is understood that when simulating the block illustrated in FIG. 2 as illustrated in FIG. 4A, in a case in which the execution result of the LD instruction is cache hit, the execution time of the block is 6 cycles.

FIG. 4B represents a timing example in a case in which the execution result of the LD instruction of the block illustrated in FIG. 2 is cache miss.

When the result of the LD instruction is cache miss, since an arbitrary time (corresponding to 6 cycles here) that is considered as sufficient for re-execution is set in the timing information 3 as a penalty, the penalty cycle is added as the delay time. Therefore, the execution of the second processing element (e2) is delayed to timing t+7. The MULT instruction executed next to the LD instruction is executed without change without affected by the delay, but the ADD instruction comes after timing t+8 of the execution completion of the LD instruction, generating a waiting time corresponding to 4 cycles (a stall corresponding to 4 cycles).

Therefore, it is understood that, as illustrated in FIG. 4B, when simulating the instruction execution of the block illustrated in FIG. 2, in a case in which the execution result of the LD instruction is a cache miss, the execution time is 10 cycles.

The prediction information 4 is information that sets the execution result (prediction result) that has a high occurrence probability in the process of the externally dependent instruction of the target code. In the prediction information, for example, "instruction cache: prediction=hit,
   data cache: prediction=hit,
   TLB search: prediction=hit,
   branching prediction: prediction=hit,
   call/return: prediction=hit, . . .
are set.

The prediction simulation executor 113 sets the prediction result of the externally dependent instruction included in the input block based on the prediction information 4, and referring to the timing information 3, executes the instruction in the case (predicted case) assuming the set prediction result, to simulate the progress of the instruction execution. The prediction simulation executor 113 obtains the execution time (the number of required cycles) of each instruction included in the block, as the simulation result.

The code generator 115 is a processor that generates, based on the simulation result of the prediction simulation executor 113, as the host code corresponding to the processed block, the host code (host code for the performance simulation) for performing the performance simulation at the time of instruction execution in the set predicted case.

The code generator 115 generates, based on the target code of the block, the host code for performing the instruction execution of the case of the predicted case in which the externally dependent instruction is the prediction result, and further embeds a code for simulation for performing a process to add the execution time of each instruction to calculate the processing time of the block.

For example, the code generator 115 generates a host code by performing simulation of the process execution of the case in which the cache access by the LD instruction in the block is "hit", for the process for which "cache hit" is set as the prediction result of the LD instruction of data, to calculate the execution time in the predicted case, and by obtaining the execution time in the case in which the cache access by the LD instruction is "miss" by the correction calculation using addition/subtraction of the execution time of the "hit" case being the predicted case.

The simulation executor 12 is a processor that executes the host code generated by the code generator 115 to perform the function and performance simulation of the instruction execution of the target CPU that executes the program (target code).

The simulation executor 12 includes code executor 121, the corrector 123.

The code executor 121 is a processor that executes the program (target code) using the host code.

The corrector 123 is a processor that obtains, during the execution of the program, when the execution result of the externally dependent instruction is different from the set prediction result (unpredicted case), the execution time of the instruction by correcting the execution time in the forecasted case that has already been obtained.

The corrector 123 performs the correction using the penalty time given to the externally dependent instruction, the execution time of instructions performed before and after the externally dependent instruction, the delay time of the immediately precedent instruction, and the like. Meanwhile, details of the correction process are described later.

The simulation information collector 13 is a processor that collects, as the execution result of the performance simulation, log information (simulation information) 5 including the execution time of each instruction.

Hereinafter, the process flow of the simulation apparatus 1 is explained.

[Code Conversion Process]

(1) The block divider 111 of the code converter 11 of the simulation apparatus 1 obtains the target code of a target program 2 and keeps it in a storage unit (not illustrated in FIG. 1), and divides the kept target code into arbitrary blocks (see FIG. 2).

(2) The prediction simulation executor 113 obtains the timing information 3, the prediction information 4 about the input target program 2, and stores them in the storage unit.

Then, the prediction simulation executor 113 sets the prediction result for each of the externally dependent instruction of the divided block based on the prediction information 4. For example, the prediction simulation executor 113 sets "hit" as the prediction result of the data cache of the LD instruction among the instruction of the block illustrated in FIG. 2.

(3) prediction simulation executor 113 interprets the code of the block and simulates the instruction execution of the case assuming the set prediction result. That is, it follows that the prediction simulation executor 113 simulates the instruction execution in the timing example illustrated in FIG. 4A.

(4) Next, the code generator 115 generates a host code from the target code based on the simulation result of the predicted case. Furthermore, the code generator 115 embeds a code for cycle simulation for performing the performance simulation (cycle simulation) into the host code (only the function code) converted from the target code.

Figure 5A:
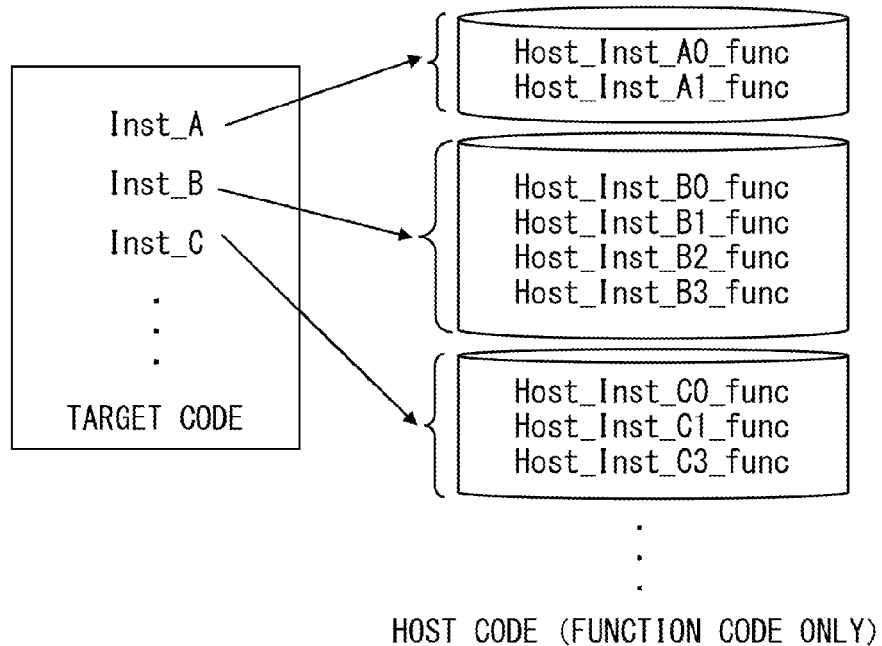
FIGS. 5A and 5B are diagrams illustrating an example in which a code for cycle simulation is embedded.
Figure 5B:
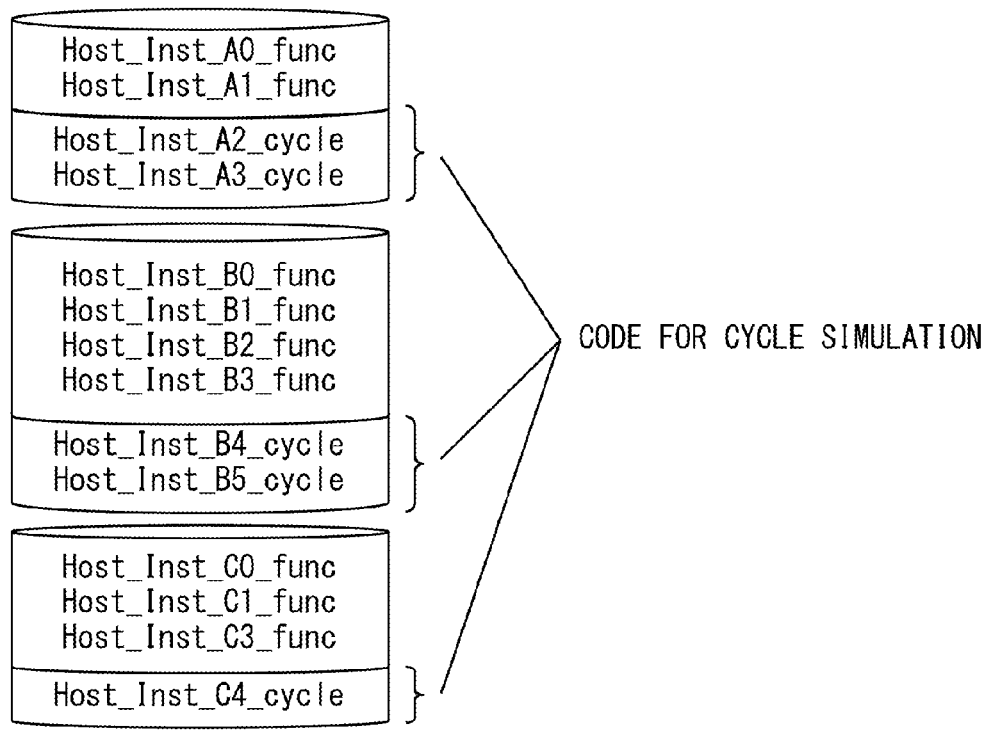

FIG. 5A is a diagram illustrating an example in which the host code of the function simulation is generated from the target code, and FIG. 5B is a diagram illustrating an example in which the code for the cycle simulation is embedded into the host code of the function simulation.

As illustrated in FIG. 5A, target code Inst_A is converted into host code Host_Inst_A0_func, Host_Inst_A1_func and target code Inst_B is converted into host code Host_Inst_B0_func, Host_Inst_B1_func, Host_Inst_B2_func, . . . and the host code with the function code only is generated.

Furthermore, to the host code with the function code only, the code for cycle simulation Host_Inst_A2_cycle, Host_Inst_A3_cycle of the target code Inst_A, and the code for cycle simulation Host_Inst_B4_cycle, Host_Inst_B5_cycle of the target code Inst_B are respectively embedded.

The code for the cycle simulation is a code for setting the execution time (the number of required cycles) of each instruction as a constant, and obtaining the processing time of the block by adding the execution time of the respective instructions together. Accordingly, it becomes possible to obtain information indicating the progress of the block execution.

Here, among the post codes, the function code, the codes for cycle simulation for the instructions other than the externally dependent instruction may be implemented using known codes, and therefore explanation of specific examples is omitted. The code for the cycle simulation for the externally dependent instruction is prepared as a helper function to call the correction process. The helper function is described later.

[Simulation Process]

(1) The code executor 121 of the simulation executor 12 performs the performance simulation of the target program 2 using the host code generated by the code converter 11.

The code executor 121 simulates the instruction execution of the target program 2, and obtains the execution time of each instruction.

(2) The code executor 121 judges, when an externally dependent instruction (an LD instruction for example) is detected, whether the execution result is different from the set prediction result, and when the execution result is different from the prediction result, requests the activation of the corrector 123. For example, when an instruction "LD, r1, r2" is detected, and the prediction result (cache hit) of the data cache and the actual execution result (cache miss) are different, the corrector 123 is called.

(3) The corrector 123 is activated in response to the call, and corrects the execution time (number of cycles) of the detected instruction "LD, r1, r2". Furthermore, the corrector 123 changes the execution timing t+n of the next instruction by the correction.

The corrector 123 corrects the execution time of the instruction every time when the execution result of an externally dependent instruction is different from the prediction result. Here, since the execution time of the externally dependent instruction in the predicted case has already been set as a constant, the corrector 123 is able to calculate the execution time of the externally dependent instruction in the unpredicted case by simple addition or subtraction of values such as the penalty time for the instruction, the execution time of instructions executed before and after of it, and the delay time of the previously processed instruction, and the like.

FIG. 6 is a diagram illustrating the processing operation of the corrector 123.

The corrector 123 is implemented as a helper function module.

In this embodiment, for example, the realization is made by embedding helper function "cache_ld (address, rep_delay, pre_delay)" into the host code instead of the conventional function "cache_ld (address)" for performing simulation for each execution result of the cache of the LD instruction.

In the helper function, "rep_delay" is the time (respite time) that was not processed as the delay time among the penalty time, until the execution of the next instruction that uses the return value of the load (ld) instruction. "pre delay" is the delay time received from the immediately-precedent instruction. "−1" indicates that there is no delay in the previous instruction. "rep_delay" and "pre_delay" are time information obtained from the result of the static analysis process of the performance simulation result and the timing information 3.

In the operation example illustrated in FIG. 6, when the difference between the current timing current_time and execution timing preld_time of the immediately-precedent instruction exceeds delay time pre_delay of the immediately-precedent instruction, the corrector 123 obtains the available delay time avail_delay by adjusting delay time pre_delay with the execution timing preld_time of the immediately-precedent ld instruction until the current timing current_time.

Next, when the execution result is cache miss, it is an error of the prediction result, and the corrector 123 corrects the execution time of the LD instruction by adding penalty cache_miss_latency for the cache miss case to the available delay time avail_delay and based on respite time rep_delay.

FIGS. 7-9 are diagrams illustrating the correction example for the execution result of the LD instruction by the corrector 123.

FIGS. 7A through 7D are diagrams illustrating a correction example for a case in which one cache miss occurs in a case in which one cache process is executed.

In the example in FIGS. 7A through 7D, the simulation of the following three instructions is performed.

"ld [r1], r2: [r1]→r2;
mult r3, r4, r5: r3*r4→r5;
add r2, r5, r6: r2+r5→r6"

FIG. 7A is a diagram illustrating a chart example of the instruction execution timing in a case in which the prediction result is "cache hit". In this predicted case, 2-cycle stall has occurred in the add instruction that is executed third.

FIG. 7B is a diagram illustrating a chart example of the instruction execution timing in a case in which the prediction result is "cache miss". In the case of the prediction error, when the execution result of the ld instruction is cache miss, a delay corresponding to the penalty cycle (6 cycles) is generated. Therefore, the mult instruction is executed without being affected by the delay, but the execution of the add instruction is delayed by 4 cycles to wait for the completion of the ld instruction.

FIG. 7C is a diagram illustrating an example of an instruction execution timing chart after the correction by the corrector 123.

Since the execution result of the ld instruction is cache miss (prediction result error), the corrector 123 adds the prescribed penalty time (6 cycles) for cache miss to the remaining execution time (2−1=1 cycle) to be the available delay time (7 cycles). The available delay time is the maximum delay time.

Furthermore, the corrector 123 obtain the execution time (3 cycles) of the next mult instruction and judges that the execution time of the next instruction does not exceed the delay time, and sets the time (7−3=4 cycles) obtained by subtracting the execution time of the next instruction from the available delay time from the available delay time as the execution time (delay time) of the ld instruction with the occurrence of delay.

In addition, the corrector 123 sets the time (3 cycles) obtained by subtracting the above delay time from the available delay time as the respite time. The respite time is the time in which the delay as the penalty is respited.

The corrector 123 returns respite time rep_delay=3, delay time of the previous instruction pre_delay=−1 (no delay) by helper function cache_ld (addr, rep_delay, pre_delay).

By this correction, the execution time of the ld instruction becomes the execution time (1+4=5 cycles) being the sum of the executed time and the delay time, and the execution time of the subsequent mult instruction and the add instruction is calculated from timing t1 of the execution completion.

That is, by just simply adding the execution time of each of the mult instruction and the add instruction (3 cycles, 3 cycles) that has been obtained in the execution result of the prediction simulation executor 113 (the result of the prediction simulation by the prediction result) to the corrected execution time of the ld instruction (5 cycles), the execution time (number of cycles) of the block may be obtained.

Therefore, by performing the correction process by the addition or subtraction only for the execution time of the instruction for which the execution result differs from the prediction, and by just adding the execution time obtained at the time of simulation based on the prediction result for other instruction, the number of execution cycles of the simulation at the time of cache miss can also be obtained.

FIG. 7D is a diagram illustrating the degree of the error in a case in which the number of cycles at the time of cache miss is obtained by simple addition by the conventional technique, to compare with the process by the simulation apparatus 1. In the case of FIG. 7D, since the delay time of the ld instruction is added without change, actually, an error has occurred due to the difference in the execution timing of the mult instruction whose execution completes during the execution of the ld instruction.

FIGS. 8A through 8D are diagrams illustrating a correction example in a case in which two cache misses occur in a case in which two cache processes are executed.

In the example in FIGS. 8A through 8D, the simulation of the following five instructions are performed.

"ld [r1], r2: [r1]→r2;
  ld [r3], r4: [r3]→r4;
  mult r5, r6, r7: r5*r6→r7;
  add r2, r4, r2: r2+r4→r2;
  add r2, r7, r2: r2+r7→r2"

FIG. 8A is a diagram illustrating a chart example of the instruction execution timing in a case in which the prediction results of the two cache processes are "cache hit". In this predicted case, it is assumed that the two ld instructions are executed at an interval of 2 cycles (usual 1 cycles+added 1 cycle).

FIG. 8B is a diagram illustrating a chart example of the instruction execution timing in a case of "cache miss" in which the prediction results of both the two cache processes are different from the prediction result. In this case of a prediction error, there is a cache miss in each of the two ld instructions, and a delay corresponding to the penalty cycles (6 cycles) is generated. However, there is an overlapping time between the delay times of the two ld instructions, and it follows that the mult instruction is executed without being affected by the delay, and the execution of the two add instructions are delayed until the completion of the second ld instruction.

FIG. 8C is a diagram illustrating an example of the instruction execution timing chart after the correction by the corrector 123.

As explained using FIGS. 7A through 7D, the corrector 123 corrects the delay time of the first ld instruction at timing t0, and returns helper function cache_ld (addr, 3, −1).

Next, at current timing t1, since the execution result of the second ld instruction is cache miss (an error of the prediction result), the corrector 123 adds the penalty cycles (6) to the remaining execution time of the ld instruction, to set it as the available delay time (1+6=7 cycles).

The corrector 123 subtract the delay time consumed before the current timing t1 (<current timing t1−execution timing of the previous instruction t0>−set interval) from the available delay time, to obtain the available delay time that exceeded the current timing t1 (7−(6−2)=3 cycles), and sets this excess available delay time as the execution time of the second ld instruction.

Furthermore, the corrector 123 subtracts the original execution time from the excess available delay time, and sets it as the delay time of the previous instruction.

In addition, the corrector 123 subtracts the sum of the delay time consumed before the current timing t1 and the available delay time exceeded at the current timing from the available delay time (7−(3+3)=1 cycles), and sets it as the respite time.

The corrector 123 corrects the delay time of the second ld instruction at the timing t1, and after that, returns helper function cache_ld (addr, 2, 1).

By this correction, the timing obtained by adding the correction value (3 cycles) to the current timing t1 becomes the execution completion timing of the ld instruction, and it follows that from that timing, the execution times of the subsequent mult instruction, add instruction are added.

FIG. 8D is a diagram illustrating the degree of the error in a case in which the number of cycles at the time of cache miss is obtained by simple addition by the conventional technique, to compare with the process by the simulation apparatus 1. In the case of FIG. 8D, it is understood that since the delay times due to the penalty of each of the two ld instructions are added without change, actually, a large error (9 cycles) has occurred. While there is also an error (1 cycle) in the process by the corrector 123 illustrated in FIG. 8C compared with the case of the correct simulation illustrated in FIG. 8B, it is understood that the calculation is done with a higher accuracy compared with the conventional method.

FIGS. 9A through 9D are diagrams for explaining a correction example in a case in which one cache miss occurs in a case in which two cache processes are executed. In the example in FIGS. 9A through 9D, the simulation of five instructions is performed in a similar manner to the explanation example illustrated in FIGS. 8A through 8D.

FIG. 9A is a diagram illustrating a chart example of the instruction execution timing in a case in which the prediction results of the two cache processes are "cache hit". In this predicted case, it is assumed that the two ld instructions are executed at an interval of 2 cycles (usual 1 cycles+added 1 cycle), in a similar manner to the case of FIG. 8A.

FIG. 9B is a diagram illustrating a chart example of the instruction execution timing in a case in which the first ld instruction is "cache miss" being different from the prediction result, and the result of the second ld instruction is the prediction result (cache hit). In the case of the prediction error, a delay corresponding to the penalty (6 cycles) occurs in each of the two ld instructions. However, there is an overlapping time between the delay times of the two ld instructions, and it follows that the mult instruction is executed without being affected by the delay, and the execution of the two add instructions are delayed until the completion of the second ld instruction.

FIG. 9C is a diagram illustrating an example of an instruction execution timing chart after the correction by the corrector 123.

As explained using FIGS. 7A through 7D, the corrector 123 corrects the delay time of the first ld instruction at the timing t0, and returns the helper function cache_ld (addr, 3, −1).

Next, at the current timing t1, since the execution result of the second ld instruction is cache hit (prediction result), the corrector 123 judges whether the time <t1−t0−set interval (6−0−2=4 cycles)> from the execution start of the second ld instruction to the current timing t1 is larger than the execution time (2 cycles) of the ld instruction.

Since the time from the execution start of the second ld instruction is larger than the execution time (2 cycles) of the ld instruction, the corrector 123 sets the current timing t1 as the execution timing of the next mult instruction.

Then, the corrector 123 treats the time (2 cycles) from the execution completion of the second ld instruction to the current timing t1 as the delay time for the next instruction, and sets delay time of the previous instruction pre_delay=2. In addition, the corrector 123 subtracts the sum of the delay time consumed until the current timing t1 and the available delay time exceeded at the current timing t1 from the available delay time of the first ld instruction (7−(6+0)=1 cycles), and returns helper function cache_ld (addr, 1, 2)

FIG. 9D is a diagram illustrating the degree of the error in a case in which the number of cycles at the time of cache miss is obtained by simple addition by the conventional technique, to compare with the process by the simulation apparatus 1. It is understood that, in the case of FIG. 9D, an error has occurred since the delay time due to the penalty of the first ld instruction is added without change.

FIG. 10 is an outline process flow diagram of the code converter 11 of the simulation apparatus 1.

In the simulation apparatus 1, the block divider 111 of the code converter 11 divides, and input, the code of the target program (target code) into blocks in prescribed units (step S1).

The prediction simulation executor 113 analyzes the instructions of the block and detects externally dependent instructions (step S2), and for all the detected instructions, based on the prediction information 4, determines the execution result with a high probability as the predicted case (step S3).

Furthermore, the prediction simulation execution 113 refers the timing information 3 and executes the performance simulation assuming the execution result set as the prediction result, for each instruction of the block (step S4).

The code generator 115 generates, based on the simulation result, the host code for the performance simulation that the simulation executor 12 executes (step S5).

By the processes of steps S1-S5 above, a host code in which a code for simulating the performance of the target CPU is embedded into the function code in the case of the set execution result (predicted case) is embedded is output.

Figure 11:
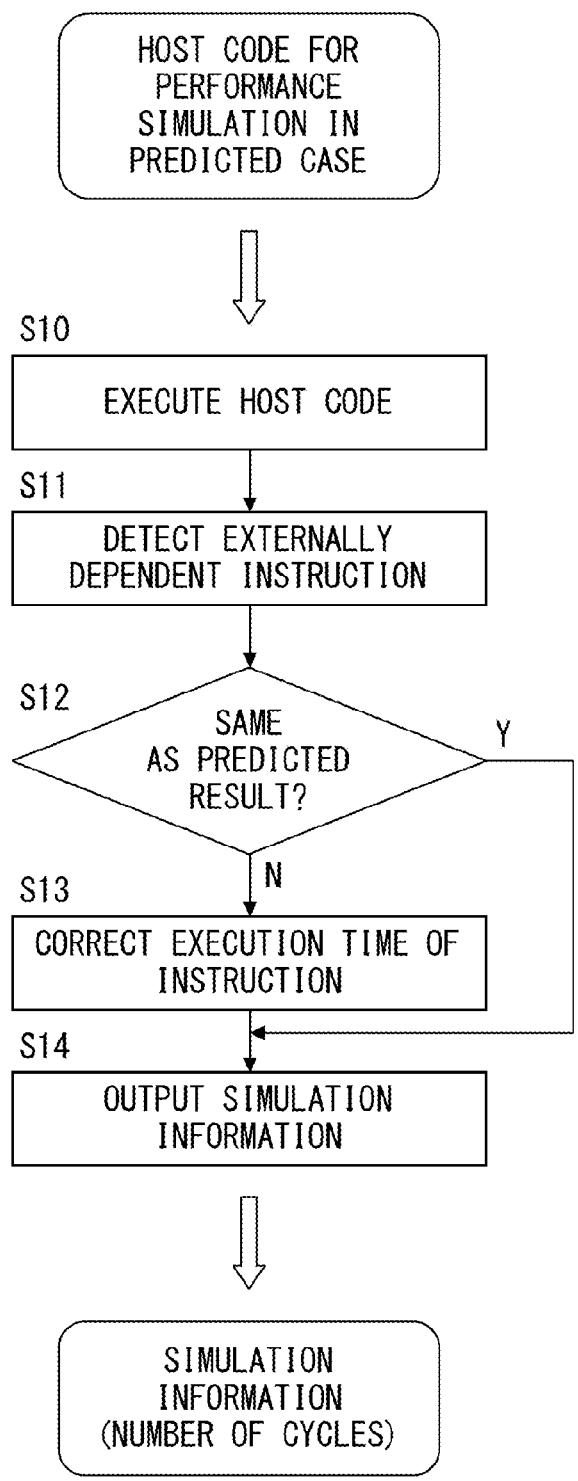
FIG. 11 is an outline process flow diagram of a simulation executor of the simulation apparatus.

FIG. 11 is an outline process flow of the simulation executor 12 of the simulation apparatus 1.

In the simulation apparatus 1, the code executor 121 of the simulation executor 12 executes the host code generated by the code generator 115, to perform the performance simulation (step S10). Upon detecting an externally dependent instruction during the execution, the code executor 121 judges whether the execution result of the instruction is the same as the one set as the prediction result (step S12). Only when the execution result of the externally dependent instruction is not the same as the prediction result (N in step S12), the corrector 123 is called, and the corrector 123 corrects the execution time of the externally dependent instruction (step S13).

Then, the simulation information collector 13 outputs the simulation information 5 for the simulation processes of all the host codes corresponding to the target program (step S14).

By the process steps of steps S10-S14 above, the simulation information (cycle simulation information) 5 of the target CPU that executes the target program 2 is output.

FIG. 12 is a diagram illustrating a process flow example of the judgment and correction of the prediction result about the process of a load (ld) instruction, as an example of an externally dependent instruction.

Upon detecting an externally dependent instruction from instructions of the block being processed, the code executor 121 calls the helper function corresponding to the corrector 123 (step S20).

The code executor 121 judges whether a cache access is required in the ld instruction (step S21), and when a cache access is required (Y in step S21), simulates the cache access (step S22). When the result of the cache access is "cache miss" ("miss" in step S23), the corrector 123 corrects the execution time (number of cycles) of the ld instruction (step S24), and outputs the corrected execution time (number of cycles) (step S25).

When no cache access is required in step S21 (N in step S21), or, when the required cache access is "cache hit", ("hit" in step S23), the corrector 123 outputs the uncorrected predicted execution time (number of cycles) (step S26).

FIG. 13 is a diagram illustrating a configuration example of the simulation apparatus 1 in another embodiment.

The simulation apparatus 1 further includes a power simulation information generator 15 in addition to the configuration example of FIG. 1.

The power simulation information generator 15 obtains power information 6, and based on simulation information 5 output by the simulation information collector 13, calculates the consumption power at the time of execution of the block, and outputs it as power simulation information 7.

FIG. 14 is a diagram illustrating an example of a case in which the power simulation information generator 15 is implemented as a function (power simulation function) to be embedded into the host code for the performance simulation.

As the power information 6, the power consumption per an execution of the LD instruction, MULT instruction, ADD instruction is set as 4u[W], 0.5u[W], 0.3u[W], respectively.

The power simulation function Host_Inst_A-C power calculates the power based on the number of execution of each instruction executed in the simulation.

Next, the hardware configuration of the simulation apparatus 1 is explained.

The simulation apparatus 1 may be implemented by a processor (CPU), a temporary storage apparatus (DRAM, flash memory and the like), a permanent storage apparatus (HDD, flash memory and the like), and a computer PC including a network interface with a network N, an input apparatus (keyboard, mouse and the like) and an output apparatus (display, printer and the like).

In addition, the simulation apparatus 1 may be implemented by a program that is executable by a computer PC. In this case, a program is provided describing the processing content of the function that the simulation apparatus 1 is to have. By the computer PC executing the provided program, the processing function of the simulation apparatus described above is realized on the computer PC.

Meanwhile, the computer PC may also read out the program directly from a portable recording medium, and may execute a process according to the program. In addition, the computer PC also may, every time a program is forwarded from a server computer, sequentially execute a process according to the received program.

Furthermore, the program may be recorded on a recording medium that is readable by the computer PC.

As described above, according to the simulation apparatus 1, it becomes possible to perform the performance simulation of the instruction execution of a CPU that controls a pipeline process at a high speed.

In the simulation apparatus 1, the code converter 11 performs, for each of divided blocks, the function simulation for the execution in a case in which the execution result of an externally dependent instruction is predicted (predicted case) as in the JIT compiler system, and sets the execution time of each instruction as a constant based on the timing information 3.

The code converter 11 of the simulation apparatus 1 embeds, instead of embedding a simulation execution code for obtaining performance simulation information (cycle simulation information) for execution in a case other than the predicted case into the host code, a code for executing a correction process of the execution time of the instruction in the predicted case.

In addition, the simulation executor 12 of the simulation apparatus 1 performs the performance simulation for the instruction execution in the case of the predicted case, and instead of the simulation in the unpredicted case, using the delay time for the instruction, the execution time of the instruction executed before and after of it, corrects the execution time in the predicted case, to obtain the execution time of the externally dependent instruction.

Therefore, compared to the conventional way, the amount of codes for simulation added to the function code may be reduced, making it possible to execute the performance simulation process at a high speed while suppressing the increase in its load.

In addition, in the simulation apparatus 1, by performing the function simulation assuming the predicted case, the execution time of each instruction in one case (predicted case) is obtained by the static analysis process, and for the execution time of an instruction in a case other than the predicted case, the execution time in the predicted case is corrected by addition or subtraction of the penalty time, the execution time of the instruction executed before and after of it, the delay time of the previous instruction, and the like.

According to the simulation apparatus 1, it becomes possible to perform the simulation of the performance, power of a system including a CPU at a high speed, and it becomes possible to easily perform the evaluation, analysis, prediction and the like of the performance, power of a large scale system as a whole, which has conventionally been difficult to perform at the practical level.

Furthermore, according to the simulation apparatus 1, it becomes possible to perform the power consumption simulation of a program, based on the power information and the performance simulation information, at a high speed and with a high accuracy.

Therefore, an effect is obtained that there is no need to perform the performance simulation for each case, and the performance simulation process is performed with a high accuracy while suppressing the increase in its load.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present invention has (have) been described in detail, it should be understood that the various changes, substitutions, and alterations could be made hereto without departing from the spirit and scope of the invention.

What is claimed is:

1. A simulation apparatus that executes a simulation of instruction execution of a program for a target processor that controls a pipeline process, the simulation apparatus comprising:
a processor configured to:
perform a process to divide a code of the program into prescribed blocks, and to set an execution result of an externally dependent instruction that is an instruction among instructions included in the blocks whose execution process depends on an external environment as a prediction result;
perform a process to perform a function simulation of the instruction execution of the program assuming the prediction result, to obtain timing information representing an execution timing of each instruction included in the blocks, and to calculate an execution time of the externally dependent instruction in the prediction result, based on a result of the function simulation and the timing information;
perform a process to generate, based on the result of the function simulation, a host code to make a host processor that makes the target processor control the pipeline process, and perform a performance simulation of the instruction execution of the program assuming the prediction result; and
when, in an execution result of execution of the generated host code by the host processor, an execution result of the externally dependent instruction included in the host code is different from the prediction result, correct the execution time of the externally dependent instruction in the prediction result by a correction value obtained using a prescribed delay time of the externally dependent instruction and an execution time of instructions executed before and after the externally dependent instruction, and set the corrected execution time of the externally dependent instruction as the execution time of the externally dependent instruction in the function simulation.

2. The simulation apparatus according to claim 1, wherein the processor performs, when an execution time of a next instruction that is executed next to the externally dependent instruction does not exceed a delay time attached to the externally dependent instruction, a process to subtract the execution time of the next instruction from the prescribed delay time of the externally dependent instruction as the correction value.

3. The simulation apparatus according to claim 1, comprising:
a power simulation information generator configured to obtain power information defining a power consumption amount per one execution of each instruction of an instruction set of the host code, and to obtain power simulation information when executing the blocks, based on the power information and the result of the function simulation.

4. A simulation method to perform a simulation of instruction execution of a program for a target processor that controls a pipeline process, the simulation method executed by a host Central Processing Unit (CPU), the simulation method comprising:
dividing a code of the program into prescribed blocks, and setting an execution result of an externally dependent instruction that is an instruction among instructions included in the blocks whose execution process depends on an external environment as a prediction result;

performing a function simulation of the instruction execution of the program assuming the prediction result, obtaining timing information representing an execution timing of each instruction included in the blocks, and calculating an execution time of the externally dependent instruction in the prediction result, based on a result of the function simulation and the timing information;

generating, based on the result of the function simulation, a host code to make the host CPU that makes the target processor control the pipeline process, and perform a performance simulation of the instruction execution of the program assuming the prediction result; and when, in an execution result of execution of the generated host code by the host CPU, an execution result of the externally dependent instruction included in the host code is different from the prediction result, correcting the execution time of the externally dependent instruction in the prediction result by a correction value obtained using a prescribed delay time of the externally dependent instruction and an execution time of instructions executed before and after the externally dependent instruction, and setting the corrected execution time of the externally dependent instruction as the execution time of the externally dependent instruction in the function simulation.

5. A non-transitory computer readable storage medium storing a simulation program to make a simulation of instruction execution of a program for a target processor that controls a pipeline, the simulation program causing a host Central Processing Unit (CPU) to execute a process comprising:

dividing a code of the program into prescribed blocks, and setting an execution result of an externally dependent instruction that is an instruction among instructions included in the blocks whose execution process depends on an external environment as a prediction result;

performing a function simulation of the instruction execution of the program assuming the prediction result, obtaining timing information representing an execution timing of each instruction included in the blocks, and calculating an execution time of the externally dependent instruction in the prediction result, based on a result of the function simulation and the timing information;

generating, based on the result of the function simulation, a host code to make the host CPU that makes the target processor control the pipeline process, and perform a performance simulation of the instruction execution of the program assuming the prediction result; and when, in an execution result of execution of the generated host code by the host CPU, an execution result of the externally dependent instruction included in the host code is different from the prediction result, correcting the execution time of the externally dependent instruction in the prediction result by a correction value obtained using a prescribed delay time of the externally dependent instruction and an execution time of instructions executed before and after the externally dependent instruction, and setting the corrected execution time of the externally dependent instruction as the execution time of the externally dependent instruction in the function simulation.

\* \* \* \* \*